(12) United States Patent
Pawar et al.

(10) Patent No.: US 8,738,063 B1
(45) Date of Patent: May 27, 2014

(54) POWER CONTROL BASED ON MULTI-ANTENNA MODE DISTRIBUTION

(75) Inventors: Hemanth Balaji Pawar, Herndon, VA (US); Swati Tiwari, Fairfax, VA (US); Krishna D. Sitaram, Chantilly, VA (US); Jong-hak Jung, Herndon, VA (US); Esmail Hejazi Dinan, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1012 days.

(21) Appl. No.: 12/257,583

(22) Filed: Oct. 24, 2008

(51) Int. Cl.
*H04B 7/00* (2006.01)

(52) U.S. Cl.
USPC .................... 455/522; 455/63.1; 455/67.13

(58) Field of Classification Search
USPC ........ 455/522, 101, 404.2, 414.1, 456.5, 450, 455/12.1, 126, 59, 69, 127.1, 423, 446, 447, 455/509, 541, 462, 452.1, 501, 513, 667.11, 455/561; 370/310, 328, 204, 206, 208, 210, 370/235, 236, 252, 258, 278, 315, 318–320, 370/334, 342, 343, 395.4, 527; 375/227, 375/260, 267, 285, 299, 347
See application file for complete search history.

(56) References Cited

U.S. PATENT DOCUMENTS

| | | | |
|---|---|---|---|
| 5,842,113 A | 11/1998 | Nanda et al. | |
| 7,020,482 B2 | 3/2006 | Medvedev et al. | |
| 7,076,263 B2 | 7/2006 | Medvedev et al. | |
| 7,221,956 B2 | 5/2007 | Medvedev et al. | |
| 7,239,886 B2 | 7/2007 | Gross et al. | |
| 2002/0067701 A1 | 6/2002 | Chen et al. | |
| 2002/0098860 A1* | 7/2002 | Pecen et al. | 455/522 |
| 2003/0139196 A1 | 7/2003 | Medvedev et al. | |
| 2003/0157954 A1 | 8/2003 | Medvedev et al. | |
| 2004/0032910 A1 | 2/2004 | Horng et al. | |
| 2004/0258012 A1* | 12/2004 | Ishii | 370/328 |
| 2005/0130694 A1 | 6/2005 | Medvedev et al. | |
| 2006/0116155 A1 | 6/2006 | Medvedev et al. | |
| 2006/0203731 A1 | 9/2006 | Tiedemann, Jr. et al. | |
| 2006/0262874 A1 | 11/2006 | Shan | |
| 2007/0118661 A1* | 5/2007 | Vishwanathan et al. | 709/227 |
| 2007/0178930 A1* | 8/2007 | Xiao et al. | 455/522 |
| 2007/0258392 A1* | 11/2007 | Larsson et al. | 370/310 |
| 2008/0132265 A1* | 6/2008 | Tudosoiu | 455/522 |
| 2008/0194226 A1* | 8/2008 | Rivas et al. | 455/404.2 |
| 2008/0214198 A1* | 9/2008 | Chen et al. | 455/450 |
| 2010/0056170 A1 | 3/2010 | Lindoff et al. | |
| 2010/0203916 A1 | 8/2010 | Tiwari et al. | |
| 2010/0322333 A1 | 12/2010 | Goransson et al. | |

OTHER PUBLICATIONS

U.S. Appl. No. 12/435,009, filed May 4, 2009.
U.S. Appl. No. 13/035,778, filed Feb. 25, 2011.

* cited by examiner

*Primary Examiner* — Edward Urban
*Assistant Examiner* — Golam Sorowar

(57) ABSTRACT

A wireless device associated with a first profile is communicated with using a first multi-antenna mode. Communication is received from a plurality of wireless devices associated with a second profile. The plurality of wireless devices are determined to be located within a defined area of the wireless device. Based on the determination that the plurality of wireless devices are located within the defined area of the wireless device, at least one of the plurality of wireless devices is sent at least one control message that instructs the at least one of the plurality of wireless devices to transmit a future communication at a lower power level.

17 Claims, 6 Drawing Sheets

POWER CONTROL BASED ON MULTI-ANTENNA MODE DISTRIBUTION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

A method of operating a communication system is disclosed. A wireless device associated with a first profile is communicated with using a first multi-antenna mode. Communication is received from a plurality of wireless devices associated with a second profile. The plurality of wireless devices are determined to be located within a defined area of the wireless device. Based on the determination that the plurality of wireless devices are located within the defined area of the wireless device, at least one of the plurality of wireless devices is sent at least one control message that instructs the at least one of the plurality of wireless devices to transmit a future communication at a lower power level.

A method of operating a communication system is disclosed. Wireless communication is received from a first plurality of wireless devices that are operating using a first multi-antenna mode. The first plurality of wireless devices are associated with a first quality of service. Wireless communication is received from a second plurality of wireless devices. The second plurality of wireless devices are associated with a second quality of service. The location of each of the first plurality of wireless devices and the second plurality of wireless devices is estimated to determine an indicator that a first threshold number of the first plurality of wireless devices is within a defined area of a second threshold number of the second plurality of wireless devices. Based on the indicator, at least one message is sent to at least one of the second plurality of wireless devices. This message instructs at least one of the second plurality of wireless devices is to lower a transmit power. Wireless communication is received from at least one of the first plurality of wireless devices using a second multi-antenna mode.

A communication system is disclosed. Using a first multi-antenna mode, a wireless base station communicates with a wireless device associated with a first profile. The wireless base station receives communication from a plurality of wireless devices associated with a second profile. The communication system determines that the plurality of wireless devices are located within a defined area of the wireless device. Based on the determination, the wireless base station sends, to at least one of the plurality of wireless devices, at least one control message that instructs the at least one of the plurality of wireless devices to communicate at a lower power level. As a result, the wireless base station communicates with the wireless device using a second multi-antenna mode.

DETAILED DESCRIPTION

In an embodiment, wireless devices may be operated in M by N multiple-input multiple-output (MIMO) antenna modes. M is the number of transmitters and/or antennas that a base station is using to transmit a data stream to a given wireless device. N is the number of receivers and/or antennas that a given wireless device is using to receive a data stream from a base station. In addition to MIMO modes that specify the number of transmitting and receiving antennas, there are MIMO modes that specify how the data stream is transmitted from the multiple transmitting antennas. Two of these modes are space-time coding MIMO and spatial multiplexing MIMO. These two modes, along with other multi-antenna techniques where M>1 and N>=1 may be referred to collectively as multi-antenna modes.

In an embodiment, wireless devices may be associated with profiles (e.g., "gold", "silver", "bronze", etc.) that are designed to differentiate the quality of service provided to wireless devices with different profiles. Based on this association, efforts are undertaken to improve the quality of service provided to wireless devices associated with higher quality of service profiles. These efforts may be at the expense of wireless devices associated with lower quality of service profiles.

Thus, a base station may be communicating with a "gold" service level wireless device using space-time coding MIMO. It may be determined that a number of "silver" or lower service level wireless devices are in the vicinity of the "gold" service level device. Based on this determination, the "silver" and lower wireless devices may be instructed to transmit at a lower power level. As a result, the "gold" wireless device experiences improved signal quality conditions. This allows the "gold" wireless device to switch to a multi-antenna mode (e.g., spatial multiplexing MIMO) that provides a higher quality of service (e.g., higher bandwidth) to the "gold" wireless device.

Figure 1:
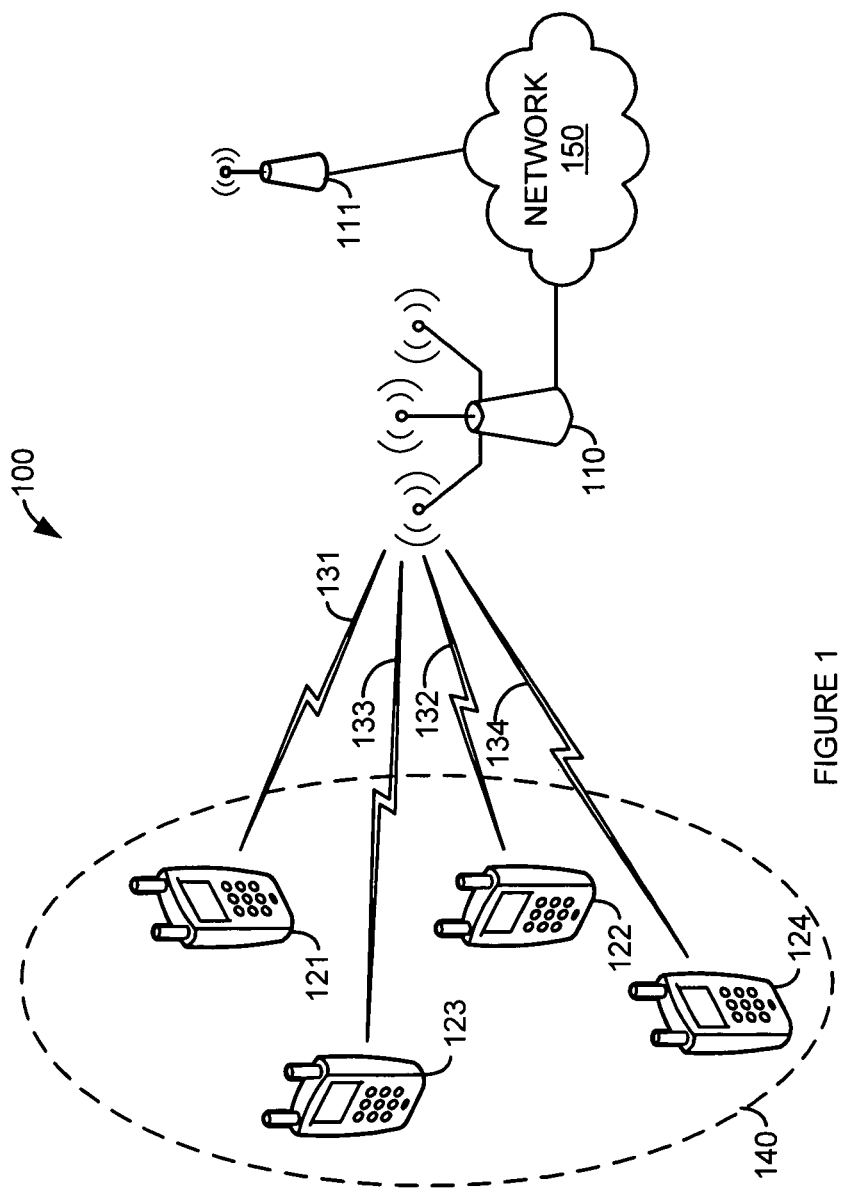
FIG. 1 is a block diagram illustrating a communication system.

FIG. 1 is a block diagram illustrating a communication system. In FIG. 1, communication system 100 comprises: base station 110, base station 111, wireless device 121, wireless device 122, wireless device 123, wireless device 124, and network 150. Wireless devices 121-124 are within defined area 140. Base station 110 is operatively coupled to network 150. Network 150 is operatively coupled to base station 111. Wireless devices 121-124 are operatively coupled to base station 110 via wireless links 131-134, respectively. Thus, wireless devices 121-124 may be operatively coupled to network 150 via base station 110. Wireless device 121-124 may also be operatively coupled to base station 111 via wireless links (not shown).

Base station 110 includes multiple antennas and multiple transmitters. Base station 110 may include multiple receivers. Wireless devices 121-124 may include multiple antennas, multiple receivers, and multiple transmitters.

Wireless devices 121-124 may be any device, system, combination of devices, or other such communication platform capable of communicating with base station 110 using multiple antennas. Wireless devices 121-124 may use communication aspects specified by the WiMAX specification including, but not limited to, the multiple-input multiple-output (MIMO) modes detailed therein. Wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas. Other types of communication platforms are possible.

Base station 110 may be any wireless system that provides the air interface to wireless devices 121-124 using multiple antennas. Base station 110 may also use one or more transmitters. Base station 110 may also use one or more receivers. Base station 110 and base station 111 may be any wireless system that can provide an air interface to wireless devices 121-124. Base station 110 and base station 111 may use communication aspects specified by the WiMAX specification including, but not limited to, the MIMO modes detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, antennas and control function. Base station 110 and base station 111 may also include other additional components such as a control function or control computer. However, these additional components have been omitted from FIG. 1 for the sake of brevity.

Network 150 may be any network or collection of networks that couple, link, or otherwise operatively connect base station 110 and base station 111 with each other or other devices or systems. Network 150 may include other secondary data networks. In an example, network 150 may include a backhaul network, a local network, a long distance network, or a packet network, or any combination thereof, as well as other types of networks.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless devices 121-124 may be operated in M by N multiple-input multiple-output (MIMO) modes. M is the number of transmitters and/or antennas that base station 110 is using to transmit a data stream to a given wireless device 121-124. N is the number of receivers and/or antennas that a given wireless device 121-124 is using to receive a data stream from base station 110. In an embodiment, M and N may both be two (2). Thus, a given wireless devices 121-124 would be said to be operating in 2×2 MIMO mode. In another embodiment, M=1 and N=2. Thus, a given wireless device would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna of base station 110 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas of base station 110 using certain principles of full or near orthogonal coding. This mode may be referred to as diversity coding MIMO or space-time coding MIMO (STC-MIMO). In a WiMAX specified system, STC-MIMO may be known as MIMO-A. SM-MIMO may be known as MIMO-B. STC-MIMO, SM-MIMO, along with other multi-antenna techniques where M>1 and N>=1 may be referred to collectively as multi-antenna modes.

Wireless device 121 may be associated with a first profile. Wireless devices 122-124 may be associated with a second profile. For example, wireless device 121 may be associated with a higher quality of service profile than wireless devices 122-124. In other words, communication system 100 may associate wireless device 121 with a profile (e.g., "gold") that is designed to differentiate wireless device 121 from wireless devices 122-124 which are associated with a lower quality of service profile (e.g., "silver" or "bronze"). Based on this association, communication system 100 may undertake efforts to improve the quality of service provided to wireless devices associated with higher quality of service profiles (e.g., wireless device 121) at the expense of wireless devices associated with lower quality of service profiles (e.g., wireless devices 122-124).

In an embodiment, base station 110 may communicate with wireless device 121 using a first multi-antenna mode. For example, base station 110 may communicate with wireless device 121 using STC-MIMO (i.e., MIMO-A). Communication system 100 may determine that wireless devices 122-124 are in the vicinity of wireless device 121. In other words, communication system 100 may determine that wireless devices 122-124 are within a defined area 140 of wireless device 121.

Thus, communication system 100 may determine that wireless device 121 which is associated with a higher quality of service profile is within a defined area 140 of a threshold number of wireless devices 122-124 that are associated with a lower quality of service profile. Based on this determination, communication system 100 or base station 110 may send a control message to one or more of wireless devices 122-124 instructing them to transmit at a lower power level. As a result, the signal to interference and noise ratio (SINR) experienced by wireless device 121 may be improved. As a result of this improvement, wireless device 121 may switch from the first multi-antenna mode to a second multi-antenna mode.

In other words, as a result of one or more lower quality of service profile wireless devices 121-124 lowering their transmit power, a higher quality of service profile wireless device 121 experiences an improved SINR. This improved SINR allows the higher quality of service profile wireless device 121 to switch to a higher bandwidth multi-antenna mode (e.g., SM-MIMO).

In an embodiment, the determination to instruct one or more of the lower quality of service profile wireless devices 121-124 to lower their power may be based on the number of lower quality of service profile wireless devices 121-124 that are in the vicinity of one or more higher quality of service profile wireless devices 121.

For example, assume there are only two lower quality of service profile wireless devices 122-123 in the vicinity of a higher quality of service profile wireless device 121. In this case, communication system 100 may decide not to instruct one or more of the lower quality of service profile wireless devices 122 and 123 to lower their power because it would not make enough of a difference in the SINR experienced by wireless device 121 to cause a change in the multi-antenna mode used by the higher quality of service wireless device 121. Thus, a count of the number of lower quality of service wireless devices 122-124 within a defined area 140 of the higher quality of service wireless device 121 may be made. This count may need to satisfy a criteria before communication system 100 sends a control message to lower transmit power.

To determine that wireless device 122-123 are within a defined area or vicinity of wireless device 121, communication system 100 may estimate locations for each of the wireless devices 121-124. There are a variety of methods that may be used to estimate locations for wireless devices 121-124. These methods may be used alone or in combination with each other or other methods. These methods may be based on round-trip delay time, triangulation, or signals received by a wireless device 121-124 from a global positioning system (GPS). In the case of a GPS system, a wireless device 121-124 may communicate its estimated position to base station 110 based on the signals it received from the GPS system.

In an embodiment, the estimated positions may be used to calculate distances from wireless device 121 to each wireless device 121-124. Thus, the defined area 140 (or vicinity) may be expressed as a circle with a defined radius. Those wireless devices 121-124 whose estimated locations are within the defined radius of wireless device 121 would be considered to be within the defined area 140.

Figure 2:
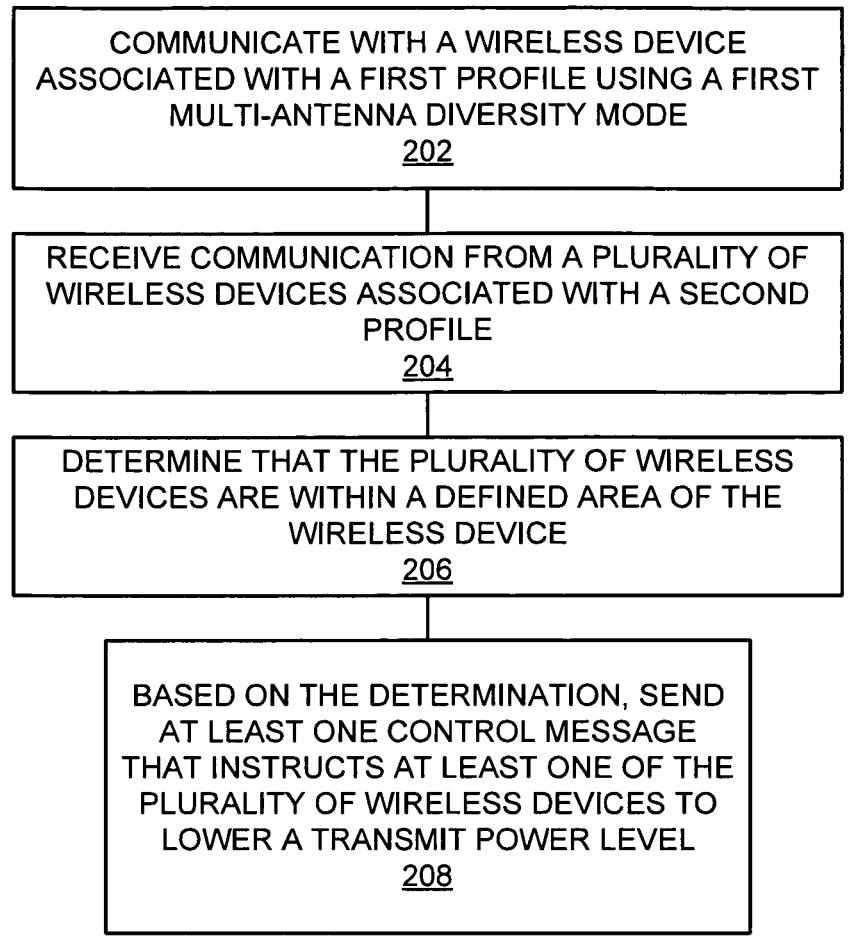
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A wireless device associated with a first profile is communicated with using a first multi-antenna mode (202). For example, base station 110 may communicate with wireless device 121 using STC-MIMO. Wireless device 121 may be associated with a first quality of service profile (e.g., "gold"). Communication is received from a plurality of wireless devices that are associated with a second profile (204). For example, base station 110 may receive communication from wireless devices 121-124. Wireless devices 121-124 may be associated with a second, and lower, quality of service profile (e.g., "silver").

The plurality of wireless devices are determined to be within a defined area of the wireless device (206). For example, communication system 100 may determine that wireless devices 122-124 are within defined area 140 of wireless device 121. Based on this determination, at least one control message is sent that instructs at least one of the plurality of wireless devices to lower a transmit power level (208). For example, base station 110 may send a control message that instructs at least one of wireless device 122-124 to lower a transmit power level. As a result, the SINR experienced by wireless device 121 may improve such that wireless device 121 switches to a second multi-antenna mode (e.g., SM-MIMO).

Figure 3:
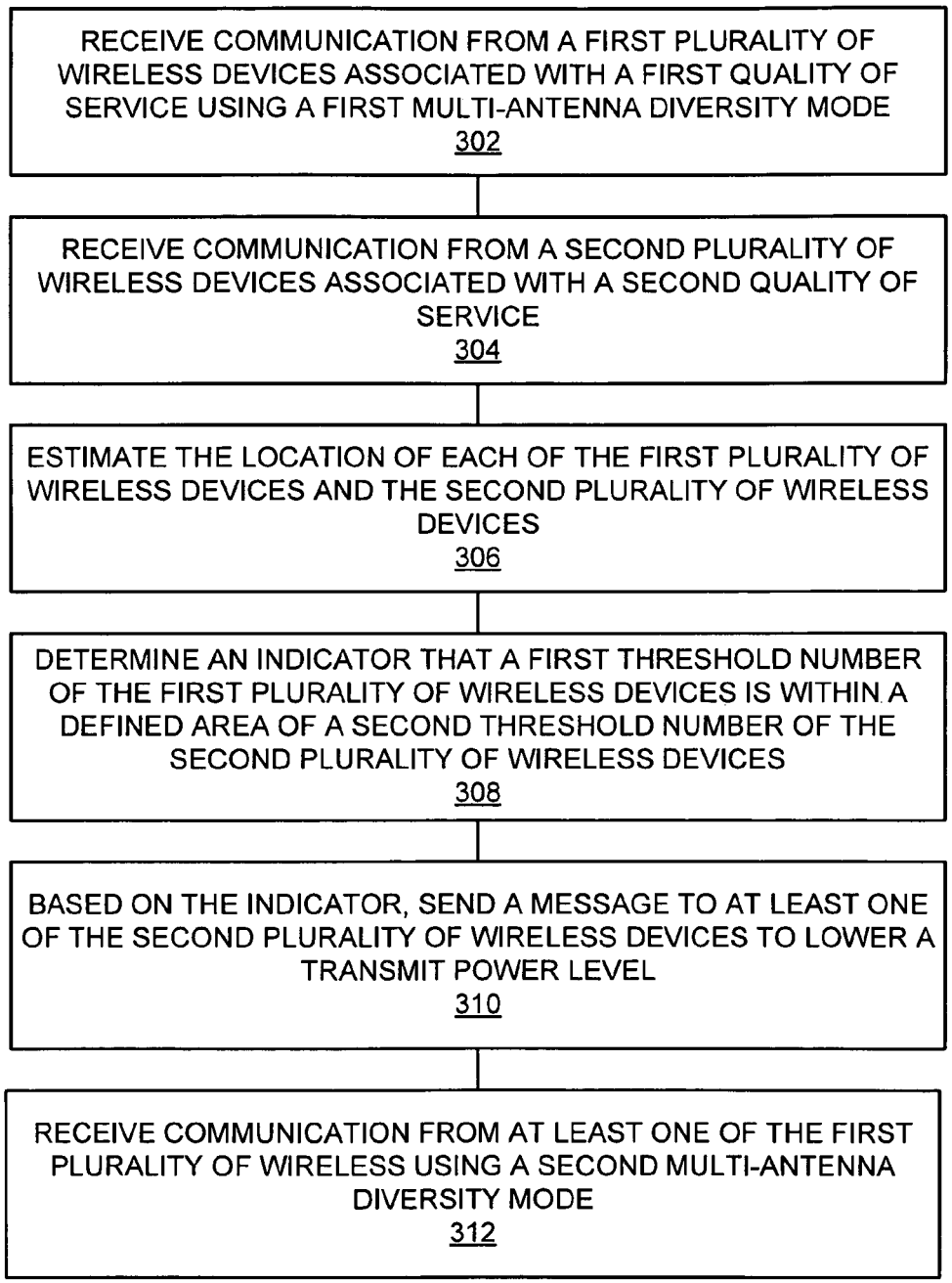
FIG. 3 is a flowchart illustrating a method of operating a communication system.

FIG. 3 is a flowchart illustrating a method of operating a communication system. The steps illustrated in FIG. 3 may be performed by one or more elements of communication system 100.

Communication from a first plurality of wireless devices associated with a first quality of service is received using a first multi-antenna mode (302). For example, wireless devices 121 and 122 may be associated with a first quality of service. Base station 110 may receive communication from wireless devices 121 and 122 using STC-MIMO.

Communication from a second plurality of wireless devices associated with a second quality of service is received (304). For example, wireless devices 123 and 124 may be associated with a second quality of service. Base station 110 may receive communication from wireless devices 123 and 124.

The location of each of the first plurality of wireless devices and the second plurality of devices is estimated (306). For example, communication system 100 may estimate the location of each of wireless devices 121-124. Communication system 100 may estimate these locations based on one or more of: round-trip delay time, triangulation, or a GPS receiver that is built-in to one or more of wireless devices 121-124.

An indicator that a first threshold number of first plurality of wireless devices is within a defined area of a second threshold number of the second plurality of wireless devices is determined (308). For example, communication system 100 may determine an indicator that more than one of wireless devices 121-122 is within a predefined radius of at least two of wireless devices 123-124. Thus, at least one of wireless devices 121 or 122 may be communicating in the first multi-antenna mode because of a SINR degradation caused by wireless devices 123-124.

Based on the indicator, a message is sent to at least one of the second plurality of wireless devices to lower a transmit power level (310). For example, base station 110 may send a control message to wireless device 123 to lower a transmit power level. As a result, the SINR experienced by at least one of wireless device 121 and 122 may improve to a point where at least one of wireless devices 121 and 122 switched to a higher bandwidth multi-antenna mode (e.g., SM-MIMO).

Communication is received from at least one of the first plurality of wireless devices using a second multi-antenna mode (312). For example, after at least one of wireless device 121 and 122 switches to a higher bandwidth multi-antenna mode, base station 110 may receive communication from wireless device 121 or 122 using the higher bandwidth multi-antenna mode.

Figure 4:
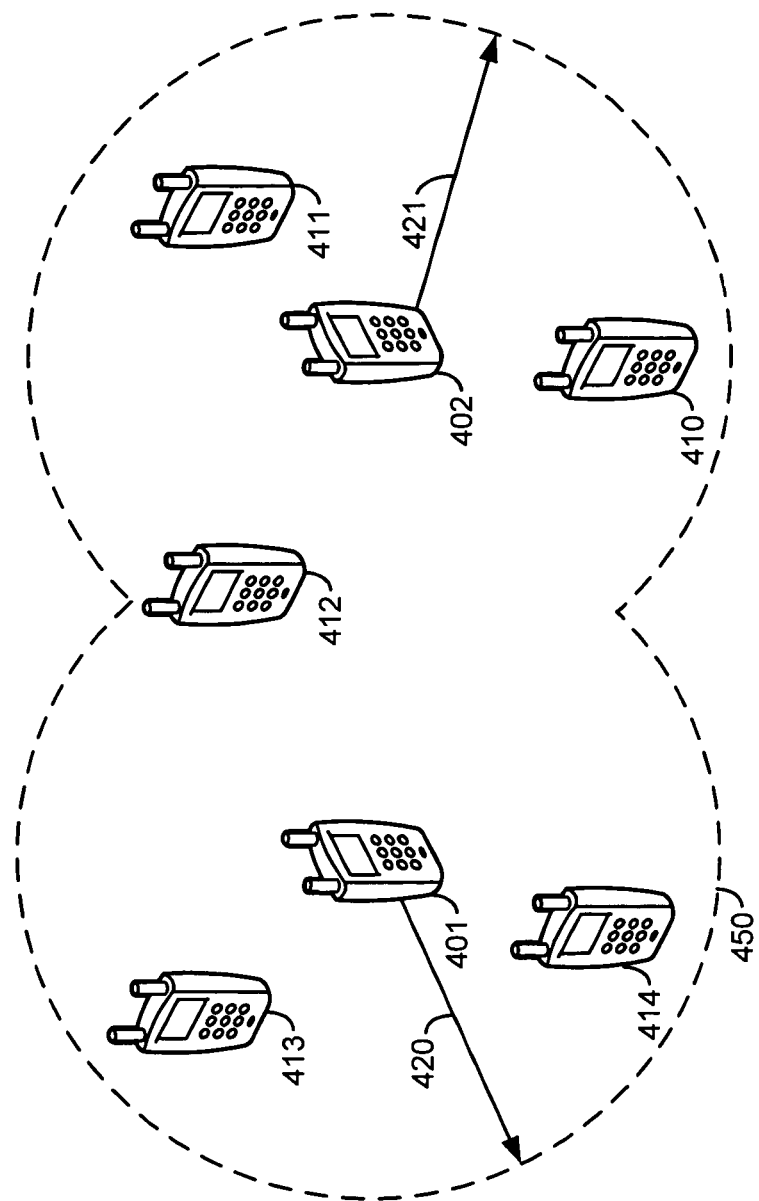
FIG. 4 is an illustration of an example defined area in the vicinity of a plurality of wireless devices.

FIG. 4 is an illustration of an example defined area in the vicinity of a plurality of wireless devices. In FIG. 4, the plurality of wireless devices consists of wireless device 401 and wireless device 402. A first radius 420 defines a first circle around wireless device 401. A second radius 421 defines a second circle around wireless device 402. First radius 420 and second radius 421 may be equal or approximately equal.

The union of the first circle and the second circle defines an area 450 that is in the vicinity of both wireless device 401 and wireless device 402. Wireless device 412, wireless device 413, and wireless device 414 are within the first radius 420 distance of wireless device 401. Wireless device 410, wireless device 411, and wireless device 412 are within the second radius 421 distance of wireless device 402. Thus, wireless devices 410-414 are all within area 450 and thus may be considered to be within a defined area 450 of a plurality of wireless devices 401 and 402. Other shapes, such as ellipsoids, surrounding a plurality of wireless devices 401-402 are possible.

Figure 5:
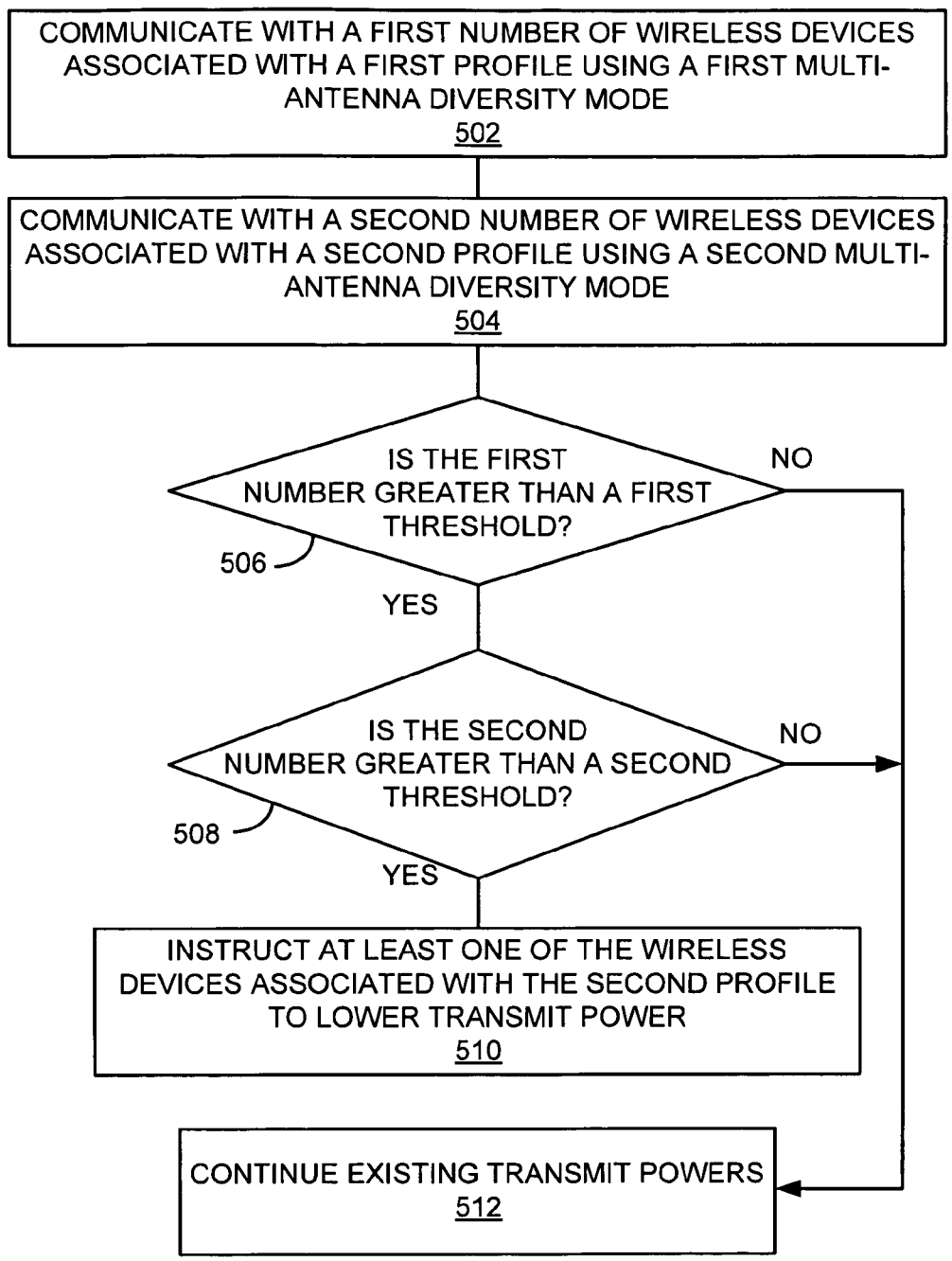
FIG. 5 is a flowchart illustrating a method of operating a communication system.

FIG. 5 is a flowchart illustrating a method of operating a communication system. The steps illustrated in FIG. 5 may be performed by one or more elements of communication system 100.

A first number of wireless devices associated with a first profile are communicated with using a first multi-antenna mode (502). For example, wireless devices 121 and 122 may be associated with a high quality of service profile. Base station 110 may communicate with these two (2) wireless devices 121 and 122 using MIMO-A. A second number of wireless devices associated with a second profile are communicated with using a second multi-antenna mode (504). For example, wireless devices 123 and 124 may be associated with a low (relative to wireless devices 121 and 122) quality of service profile. Base station 110 may communicate with these two (2) wireless devices 123 and 124 using MIMO-B.

If the first number is greater than a first threshold, flow proceeds to block 508 (506). If the first number is not greater than a first threshold, flow proceeds to block 512. In block 512, the wireless devices associated with the second profile continue to transmit at their existing power levels.

If the first number is greater than a first threshold, flow proceeds to block 510 (508). If the first number is not greater than a first threshold, flow proceeds to block 512. At least one of the wireless devices associated with the second profile is instructed to lower a transmit power (512).

Thus, if communication system 100 determines: (1) a relatively large (e.g., greater than a first threshold) number of wireless devices 121-122 associated with a high quality of service profile are using MIMO-A, and, (2) a relatively large (e.g., greater than a second threshold) number of wireless devices 123-124 associated with a low quality of service level are using MIMO-B, the communication system 100 may instruct the low quality of service profile wireless devices 123-124 to lower a transmit power. As a result, the SINR experienced by the high quality of service profile wireless devices 121-122 may improve. This improvement may allow one or more of the high quality of service profile wireless device 121-122 to switch to a higher bandwidth multi-antenna mode (e.g., MIMO-B). Thus, the high quality of service profile wireless devices 121-122 may experience improved throughput performance.

The methods, systems, devices, networks, and base stations described above may be implemented with, contain, or be executed by one or more computer systems. The methods described above may also be stored on a computer readable medium. Many of the elements of communication network 100 may be, comprise, or include computers systems. This includes, but is not limited to: wireless devices 121-124, base station 110, base station 111, and network 150.

Figure 6:
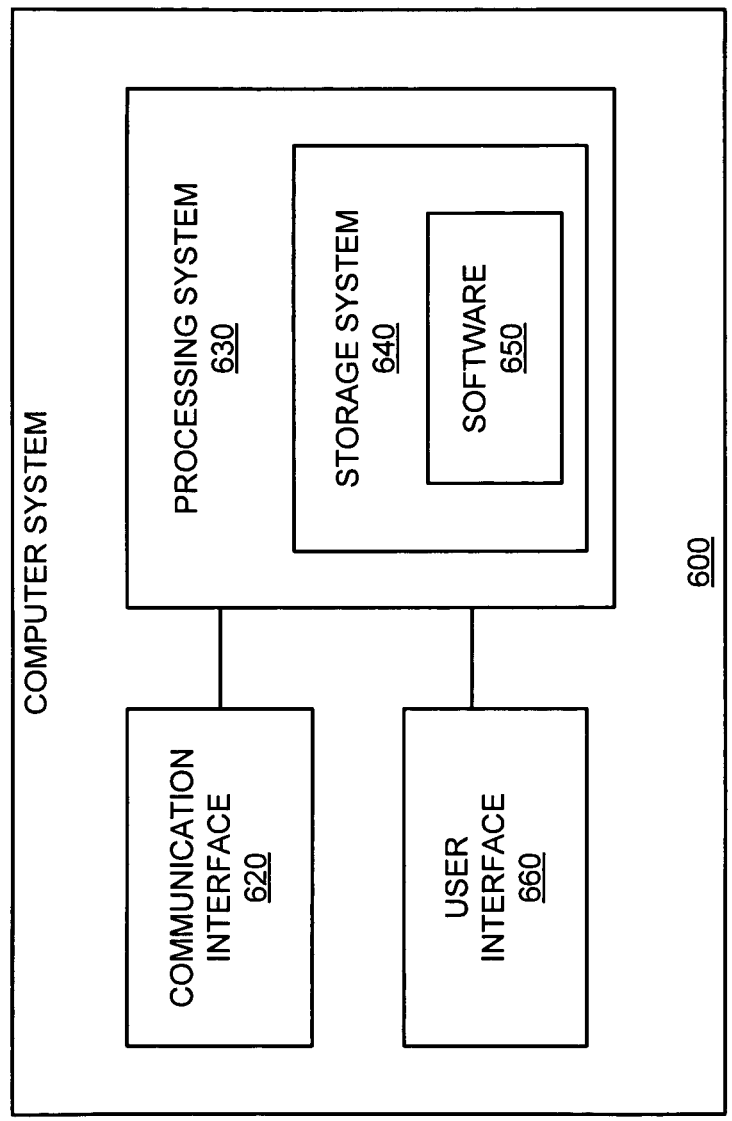
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:

communicating, using a first multiple-input multiple-output (MIMO) mode, with a first wireless device associated with a first quality of service level;

receiving communication from a plurality of wireless devices and identifying the plurality of wireless devices as associated with a second quality of service level comprising a lower level of service than the first quality of service level;

determining that the plurality of wireless devices are located within a predefined radius from the first wireless device; and based on the determination that the plurality of wireless devices are located within the predefined radius from the first wireless device and that the plurality of wireless devices are associated with the second quality of service level, sending, to at least one of the plurality of wireless devices, at least one control message that instructs the at least one of the plurality of wireless devices to transmit a future communication at a lower power level to establish a reduced interference level experienced by the first wireless device; and after sending the at least one control message, communicating using a second MIMO mode with the first wireless device, the second MIMO mode comprising a higher bandwidth communication mode than the first MIMO mode, wherein the first wireless device determines to communicate using the second MIMO mode based on the reduced inference level.

2. The method of claim 1, wherein there are a first quantity of the plurality of wireless devices, and wherein the sending the at least one control message is further based on the first quantity exceeding a threshold quantity.

3. The method of claim 1, wherein the determining that the plurality of wireless devices are located within the predefined radius from the first wireless device is based on an estimated location of the first wireless device and a plurality of estimated locations of the plurality of wireless devices.

4. The method of claim 3, wherein the estimated location of the first wireless device is based on round trip delay.

5. The method of claim 3, wherein the estimated location of the first wireless device is based on triangulation.

6. The method of claim 3, wherein the estimated location of the first wireless device is based on a location estimated by the first wireless device based on signals received from a global positioning system.

7. The method of claim 3, wherein the predefined radius is based on at least one distance from the first wireless device to at least one of the plurality of wireless devices.

8. A method of operating a communication system, comprising:
receiving wireless communication from a first plurality of wireless devices that are operating using a first multiple-input multiple-output (MIMO) mode, the first plurality of wireless devices being associated with a first quality of service level;
receiving wireless communication from a second plurality of wireless devices, the second plurality of wireless devices being associated with a second quality of service level;
estimating the location of each of the first plurality of wireless devices and the second plurality of wireless devices to determine an indicator that a first threshold number of the first plurality of wireless devices is within a predefined radius from a second threshold number of the second plurality of wireless devices and that the plurality of wireless devices are associated with the second quality of service level; and
based on the indicator, sending at least one message to at least one of the second plurality of wireless devices that the at least one of the second plurality of wireless devices is to lower a transmit power to establish a reduced interference level experienced by at least one of the first plurality of wireless devices; and
after sending the at least one message, receiving wireless communication from the at least one of the first plurality of wireless devices using a second MIMO mode, wherein the at least one of the first plurality of wireless devices determines to communicate using the second MIMO mode based on the reduced inference level.

9. The method of claim 8, wherein the second quality of service level comprises a lower level of service than the first quality of service level, and wherein the second MIMO mode comprises a higher bandwidth communication mode than the first MIMO mode.

10. The method of claim 8, wherein the predefined radius comprises an area around at least one of the first plurality of wireless devices encompassed by a circle having a first radius.

11. The method of claim 8, wherein the predefined radius comprises an area determined by a union of areas around each of the first plurality of wireless devices encompassed by a circle having a first radius.

12. The method of claim 8, wherein the predefined radius comprises an area determined by a union of areas around each of the second plurality of wireless devices encompassed by a circle having a first radius.

13. The method of claim 8, wherein the indicator is determined using at least one of round trip delay, triangulation, and signals received from a global positioning system to determine whether the second threshold number of the second plurality of wireless devices is located within the predefined radius.

14. The method of claim 8, wherein the indicator is determined using at least one of round trip delay, triangulation, and signals received from a global positioning system to determine whether the first threshold number of the first plurality of wireless devices is located within the predefined radius.

15. A communication system, comprising:
a wireless base station configured to communicate, using a first multiple-input multiple-output (MIMO) mode, with a first wireless device associated with a first quality of service level and receives communication from a plurality of wireless devices associated with a second quality of service level comprising a lower level of service than the first quality of service level; and
the communication system configured to determine that the plurality of wireless devices are located within a predefined radius from the first wireless device and that the plurality of wireless devices are associated with the second quality of service level; and
based on the determination, the wireless base station is configured to send, to at least one of the plurality of wireless devices, at least one control message that instructs the at least one of the plurality of wireless devices to communicate at a lower power level to establish a reduced interference level experienced by the first wireless device; and
after sending the at least one control message, the wireless base station is configured to communicate with the first wireless device using a second MIMO mode comprising a higher bandwidth communication mode than the first MIMO mode, wherein the first wireless device determines to communicate using the second MIMO mode based on the reduced inference level.

16. The communication system of claim 15, wherein the determination that the plurality of wireless devices are located within the predefined radius from the first wireless device is based on an estimated location of the first wireless device and a plurality of estimated locations of the plurality of wireless devices.

17. The communication system of claim 16, wherein the estimated location and the plurality of estimated locations are determined using at least one of round-trip delay, triangulation, and a global positioning system location reported to the communication system.

* * * * *